Patented Mar. 10, 1936

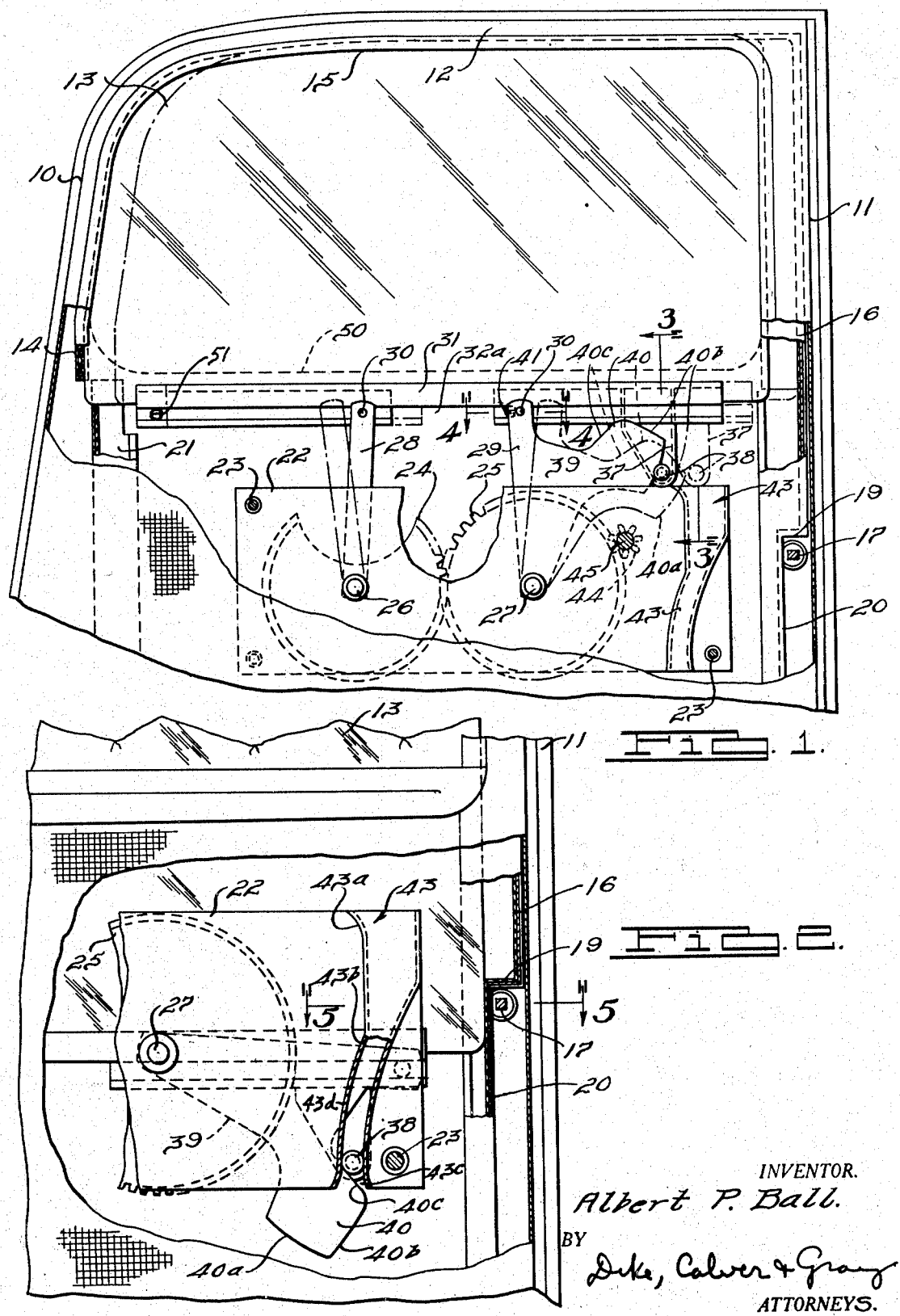

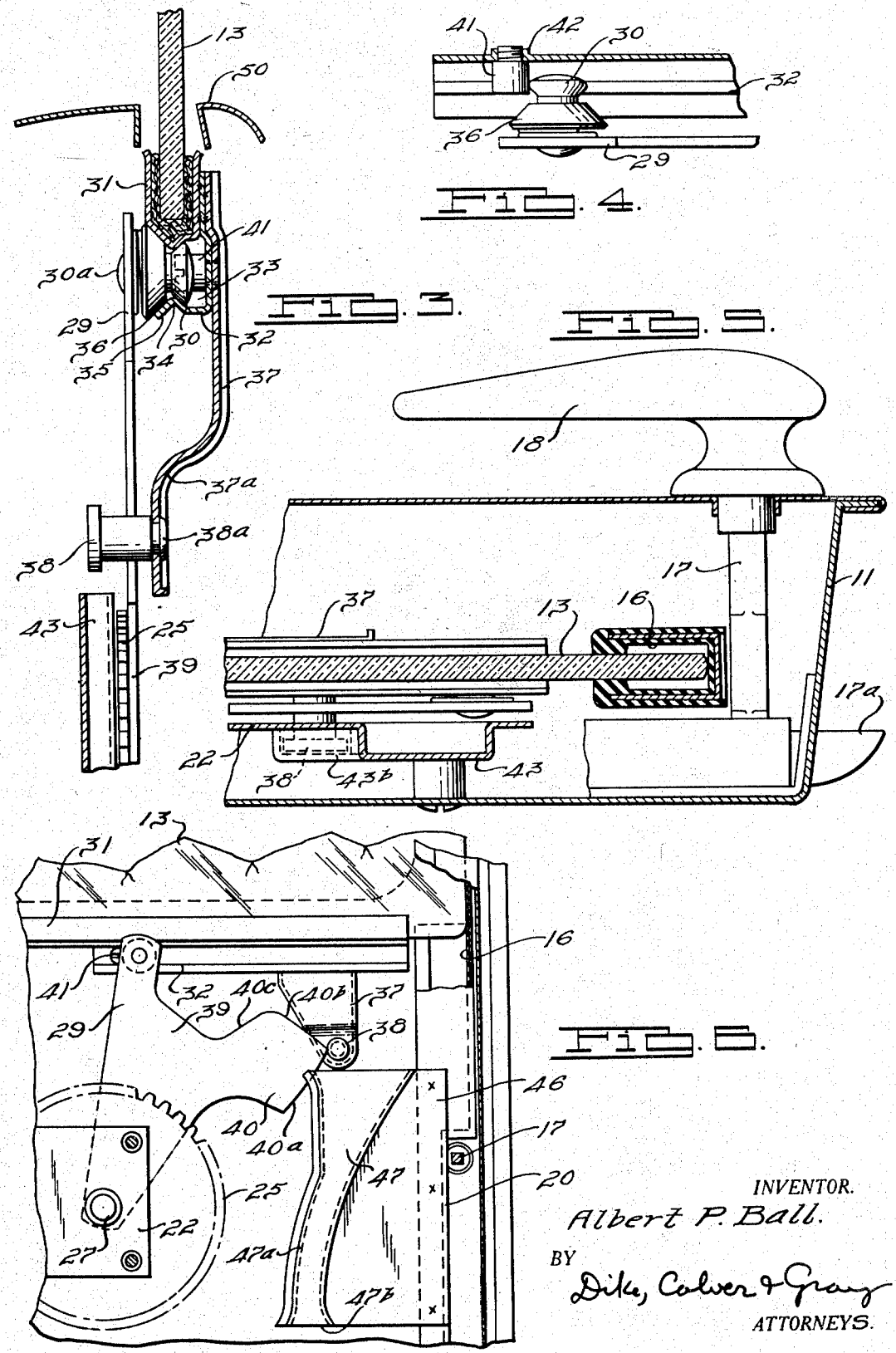

2,033,872

UNITED STATES PATENT OFFICE 2,033,872

VENTILATING WINDOW MECHANISM

Albert P. Ball, Detroit, Mich., assignor, by mesne assignments, to Automobile Ventilation, Inc., Detroit, Mich., a corporation of Michigan Application June 21, 1934, Serial No. 731,717

16 Claims. (Cl. 268—126)

This invention relates to ventilating windows for vehicle bodies and more particularly to window ventilation in doors of automobile bodies. An object of the invention is to provide an improved and relatively simple and economical mechanism for raising and lowering the window glass in the body or door and for providing a ventilating slot at the forward edge of the glass when the glass is fully raised, and also for sliding the glass in its plane into and out of position to close said ventilating slot.

In accordance with the present preferred embodiment of the invention it is desirable to raise the glass vertically into ventilating position in the window opening and thence shift it forwardly into fully closed position. Such a construction has the important advantage of ensuring the tight closing of the window when the regulator has been operated to the limit of its travel in one direction, thus preventing the danger of accidently leaving the window partly open at its top as a consequence of the regulator mechanism overrunning in the use of structures in which the glass is first elevated into fully closed position and then shifted rearwardly to ventilating position.

Where it is desirable to use the present structure, in which the window is first shifted vertically into ventilating position, in a vehicle door hinged at its forward edge, difficulty has been experienced in causing the rear edge of the glass to pass the lock mechanism during its vertical travel except where an undesirably wide rear door pillar is provided.

The foregoing disadvantages are overcome by virtue of the present invention whereby means is provided for shifting or displacing the glass longitudinally during its vertical travel so as to pass or clear any latch obstruction, thus permitting a deep channel or glass runway to be used at the upper rear edge of the glass without, however, necessitating any increase in the width or thickness of the rear door pillar.

Other objects of this invention will appear in the following description and appended claims, reference being had to the accompanying drawings forming a part of this specification wherein like reference characters designate corresponding parts in the several views.

Fig. 1 is a fragmentary side elevation illustrating a front door of an automobile body embodying the present invention.

Fig. 2 is an enlarged fragmentary view, partly in section, illustrating a predetermined position of the operating mechanism.

Fig. 3 is a section taken through lines 3—3 of Fig. 1 in the direction of the arrows.

Fig. 4 is a detail section taken through lines 4—4 of Fig. 1 in the direction of the arrows.

Fig. 5 is an enlarged section taken through lines 5—5 of Fig. 2 in the direction of the arrows.

Fig. 6 is a fragmentary elevation, in part similar to Fig. 1, but illustrating a modification.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated, by way of example, a front door of an automobile having a window glass mounted therein and adapted to be elevated by regulator mechanism into position within the window opening of the door to provide a ventilating slot between the forward edge of the glass and the adjacent door pillar. The regulator mechanism is thus operative to move the window glass into its top vertical position while maintaining it at the same time in ventilating position, and this mechanism is also operative to shift the glass forwardly in its plane to close the ventilating slot and thus fully close the window opening. In the illustrated construction the door is hinged at its forward edge and is, therefore, provided with latch mechanism mounted in the rear pillar of the door. In order to permit the window glass to be moved vertically and upwardly into ventilating position and at the same time to prevent interference with the latch mechanism, the present invention provides means for shifting the window glass horizontally in its plane at an intermediate point between its upper and lower positions so as to clear or avoid the latch mechanism and thus enable the rear edge of the window to overlie the latch mechanism when the glass is in its top ventilating position.

As illustrated in the drawings, the door comprises a front pillar 10 and a rear pillar 11 connected at their upper ends by the usual header 12. The front and rear pillars together with the header define a window opening which is adapted to be closed by means of a glass panel 13. Mounted in the front pillar 10 is a felted glass channel 14 adapted to receive the forward edge of the glass when fully closed, as shown in full lines in Fig. 1. The channel 14 extends upwardly and rearwardly at 15 within the header 12 so as to confine the upper edge of the glass when closed. The rear pillar 11 is constructed so as to provide a relatively deep glass channel or runway 16 to receive the rear edge of the glass when the latter is in ventilating position, as shown in dotted lines in Fig. 1. The glass channel 16 is of sufficient depth to confine the rear edge of the glass when it is shifted forwardly to close the ventilating slot.

It will be understood that in the present instance the front pillar 10 of the door is hinged to the front body pillar so that the door is latched, when closed, at its rear edge. A latch or locking mechanism for the door may comprise a transverse rotatable shaft 17 extending through the pillar 11 as shown in Fig. 5, this shaft being turned by means of a handle 18 to retract the latch bolt 17a. It will be seen that the shaft 17 of the latch mechanism underlies the glass channel 16 and as a result it is not possible to shift the glass in a straight vertical line into and out of ventilating position. In the present construction the deep glass runway or channel 16 terminates at 19 above the shaft 17 in a forwardly offset shoulder and thence the runway or channel extends downwardly within the door pillar forwardly of the shaft 17, providing a relatively shallow extension 20. The front pillar 10 is provided with an auxiliary glass runway or channel 21 below the window sill 50 and effective in cooperation with the shallow channel 20 to guide the window glass during the lower part of its travel.

The window regulator mechanism for raising and lowering the glass 13 may be of any suitable construction and in the present instance comprises a mounting plate 22 secured by screws 23 to the inside of the door well. The plate 22 carries a pair of meshing gears 24 and 25 which are journaled on the plate by means of pivots 26 and 27 respectively. Secured to the pivot 26 is a swinging arm 28 and secured to the pivot 27 is a swinging arm 29, these arms being swung in opposite directions upon rotation of the gears. Secured to the outer end of each of the arms 28 and 29 is a stud or button-like device 30 having a shank riveted at 30a to the end of the arm. Along the lower edge of the glass there is fastened a felt lined channel 31. A plate or plates are spot welded to one face of the channel 31, see Fig. 3, and have depending walls forwardly flanged at 32 along their lower edges to provide with the lower edge of the channel 31 a runway or runways 33 for the studs 30. Each runway, as shown at 34 in Fig. 3, has a constricted neck forming upper and lower tapered faces engaging the tapered sides of the stud 30, and the members 31 and 32 which together form the glass retainer member, have outwardly flared bearing surfaces, indicated at 35, engaged by conical spring pressed washers 36. From this construction it will be seen that when the arms 28 and 29 are swung relatively to each other, the studs 30 will slide horizontally in the runways or camways 33 and thus raise the lower the window glass.

Secured as by welding to one side of the glass retainer member is a depending extension or hanger 37 which is offset at 37a, and to the lower offset end of this hanger is riveted at 38a a headed pin 38. In the present instance the arm 29 is provided with a lateral extension or auxiliary arm 39 provided with a cam 40. This cam is cut so as to provide successive cam edges 40a, 40b and 40c adapted to cooperate with the pin 38 during the vertical and horizontal travel of the window glass, as hereinafter more fully described. Within the guideway 33 of the glass retainer member 31—32 is located a projecting stud or pin 41, this pin having a threaded end adapted to be screwed into a tapped boss 42 in the back wall of the guideway and thereby being detachable. The pin or screw 41 extends into the path of the stud 30 on the arm 29, these parts cooperating as hereinafter described to shift the window horizontally in its plane so as to close the ventilating slot.

In the embodiment of the invention shown in Figs. 1 to 5 inclusive, the mounting plate 22 of the regulator is extended at one end and this portion of the plate is stamped or pressed to provide a vertical channel 43 located substantially in line with the pin 38. The upper end 43a of the channel may have an enlarged or flared mouth, and at a predetermined point in its length the channel 43 is provided with a cam slot 43b terminating in an open end 43c. The gearing 24 and 25 is operated through a pinion 44 on a shaft 45 to which is attached the usual crank handle.

In operation it will be seen that when the window is in its fully closed position, as shown in full lines in Fig. 1, the regulator arms 28 and 29 will occupy their respective positions also shown in full lines in this figure. At this time the pin 38 will be in engagement with the cam edge 40a of the cam 40, and the pin 41 will be in engagement with the stud 30 on the arm 29, thus blocking the window against rearward movement as a result of any forces which may be applied directly to the window. As the regulator arms are swung outwardly and away from each other, the cam 40a traveling against the pin 38 will shift the window horizontally and rearwardly in its plane into the deep glass runway 16, the position of the parts at this time being shown in dotted lines in Fig. 1, and the pin 38 being disposed substantially at the juncture of the cam edges 40a and 40b. Continued swinging movement of the regulator arms in the same direction will thereupon lower the window glass 13 in the deep runway 16 and while in ventilating position. The pin 38 will travel over the cam edge 40b and in engagement therewith thus holding the rear edge of the window glass against the bottom of the glass runway 16 and also effecting a third point of support for the glass. As the glass is lowered the pin 38 travels into the open upper end of the channel 47, and when the lower edge of the glass approaches the offset 19 in the deep runway 16, the pin 38 travels into the cam slot 43b, and by cooperative engagement of these parts during the downward travel of the pin 38, the window glass will be shifted forwardly, before reaching the offset 19, so that its rear edge will be in line with the channel 20 and in advance of the shaft 17 of the latch. Thence the window glass will be carried downwardly and guided within the glass runways 20 and 21, as seen for example in Fig. 2, and during this time the pin 38 will travel onto the cam edge 40c. Further downward travel of the window will cause the pin 38 to travel out of the open rear end 43c of the camway until the window reaches its lowest position. By turning the gears in the opposite direction and thus swinging the arms 28 and 29 upwardly, the reverse action will take place, the pin 38 traveling upwardly through the camway 43b which, in conjunction with the cam edge 40c, will shift the glass rearwardly from the runway 20 into the deep runway 16 above the latch shaft 17. After the glass has reached its fully elevated position, as shown in dotted lines in Fig. 1, and is at the same time in ventilating position with a ventilating slot formed between its forward edge and the runway 14, continued swinging movement of the arms 28 and 29 toward each other will cause the stud 30 to engage the stop 41 and shift the glass forwardly in its plane to close the ventilating slot.

The regulator arms may be assembled with the glass retainer member 31 by inserting the studs 30 vertically through the cut away portion 32a in the runway and thereafter swinging the arms so as to cause the studs to travel into the runways 33, after which the stop pin 41 may be placed in position.

The modified construction shown in Fig. 6 differs from the foregoing structure in that the vertical camway is not carried by the mounting plate 22 but is formed in a separate plate 46 spot welded to the pillar 11. This plate is clamped or pressed to provide a channel 47 having a camway 47a corresponding identically to the camway 43b in the previous embodiment, this camway terminating in an open end 47b for the passage of the pin 38 during the lowering of the window glass. The operation of the parts and the movement of the glass in this modification are identically the same as above described.

Where it is desired to shorten the length of the mounting plate 22 in the embodiment shown in Figs. 1 and 2, the plate may terminate along the line 43d in a cam-forming flange corresponding in contour to line 43d. Thus, as the window travels upwardly the pin 38 will bear against the cam face 43d which will shift the glass rearwardly into the deep channel 16. For the purpose of obtaining the reverse movement of the glass as it is lowered there may be provided in the forward runway 33 of the glass retainer a stop 51 (Fig. 1) in the form of a screw identical with the screw 41, above described. This screw or pin 51 will be engaged at the proper time by the stud 30 on arm 28, and due to the arcuate travel of the stud 30 it will shift the glass forwardly out of the deep channel 16. This forward and downward travel thus imparted to the glass, and hence to the pin 38, will of course conform to the contour of cam 43d against which the pin will ride during this downward movement.

It will thus be seen that during the vertical travel of the glass 13 in the deep channel 16 the pin 38 riding on the cam edge 40b will block the window glass against any forward movement relative to the channel 16. Moreover, since the pin 38 will travel vertically in contact with the forward vertical top edge of the camway 43 or 47, the window glass will additionally be held within the deep channel against forward movement by the cooperation of these parts. Since, therefore, the upper vertical edge of the camway 43 or 47 adjacent the upper end thereof performs the same function in maintaining the glass within the channel 16 as the cam edge 40b, it will be understood that the latter, if desired, may be omitted. It will also be understood that in lieu of the detachable screw forming the stop 51 in the channelway of the glass retainer member an integral lug may be struck out from the vertical wall of the member 32 so as to extend, as in the case of the screw 51, into the path of the stud 30 on the arm 28.

I claim:

1. In a vehicle body having a window opening and a window glass mounted therein for successive vertical and horizontal movements in the plane of the glass, regulator mechanism for shifting said glass vertically into elevated position while maintaining a ventilating slot at the forward edge of the glass, said mechanism being operative to shift the glass forwardly to close said slot while the glass is in elevated position, and means for shifting the glass horizontally in its plane during the vertical travel thereof.

2. In a vehicle body having a window opening and a window glass mounted therein for successive vertical and horizontal movements in the plane of the glass, regulator mechanism for shifting said glass vertically into elevated position while maintaining a ventilating slot at the forward edge of the glass, said mechanism being operative to shift the glass forwardly to close said slot while the glass is in elevated position, and cam means for shifting the glass horizontally in its plane during the vertical travel thereof intermediate its raised and lowered positions.

3. In a vehicle body having a window opening and glass runways for guiding a window glass vertically in said opening, regulator mechanism connected to the glass for raising the glass into position in said opening to provide a ventilating slot between one vertical edge of the glass and the adjacent runway, means cooperating with said regulator for shifting the glass horizontally in its plane while elevated to close said slot, and means for shifting the glass in its plane toward and from said last named runway during the verticl travel of the glass.

4. In a vehicle body having a window opening and glass runways for guiding a window glass vertically in said opening, regulator mechanism connected to the glass for raising the glass into position in said opening to provide a ventilating slot between one vertical edge of the glass and the adjacent runway, means cooperating with said regulator for shifting the glass horizontally in its plane while elevated to close said slot, and means cooperating with said regulator mechanism for shifting the glass in its plane toward and from said last named runway during the vertical travel of the glass.

5. In a vehicle body having a window opening and glass runways for guiding a window glass vertically in said opening, regulator mechanism connected to the glass for raising the glass into position in said opening to provide a ventilating slot between one vertical edge of the glass and the adjacent runway, means cooperating with said regulator for shifting the glass horizontally in its plane while elevated to close said slot, and means cooperating with said regulator mechanism for shifting the glass in its plane toward and from said last named runway during the vertical travel of the glass, said last means including a cam mounted on a fixed part of the body.

6. In an automobile body having a window opening and a window glass mounted therein for successive vertical and horizontal movements in its plane, mechanism for raising and lowering the glass, for shifting the glass in its plane when elevated into and out of position to provide a ventilating slot at one upright edge thereof, and also for shifting the glass horizontally in its plane at a position of the glass intermediate its fully elevated and lowered positions.

7. Regulator mechanism for a window glass mounted in a vehicle body window opening for successive vertical and horizontal movements in its plane, comprising a swinging arm connected to the lower edge of the glass for raising and lowering the same, a cam carried by said arm and cooperating with a part on the glass for sliding the glass horizontally in its plane, and cam means cooperating with said part during the vertical travel of the glass for shifting the same horizontally in its plane.

8. Regulator mechanism for a window glass mounted in a vehicle body window opening for successive vertical and horizontal movements in its plane, comprising a swinging arm connected to the lower edge of the glass for raising and lowering the same, a cam carried by said arm and cooperating with a part on the glass for sliding the glass horizontally in its plane, and cam means cooperating with said part during the vertical travel of the glass for shifting the same horizontally in its plane, said cam means being carried by a fixed portion of the body.

9. Regulator mechanism for a window glass mounted in a vehicle door window opening for successive vertical and horizontal movements in its plane, comprising a swinging arm connected to the lower edge of the glass for raising and lowering the same, a projecting stud fixed to the said edge of the glass and a cam on said arm cooperating with the stud for shifting the glass horizontally in its plane when elevated, and cam means cooperating with said stud for shifting the glass horizontally in its plane during its vertical movement.

10. Regulator mechanism for a window glass mounted in a vehicle door window opening for successive vertical and horizontal movements in its plane, comprising a swinging arm connected to the lower edge of the glass for raising and lowering the same, a projecting stud fixed to the said edge of the glass and a cam on said arm cooperating with the stud for shifting the glass horizontally in its plane when elevated, and cam means cooperating with said stud for shifting the glass in opposite directions horizontally in its plane during the raising and lowering thereof.

11. Regulator mechanism for a window glass mounted in a vehicle door window opening for successive vertical and horizontal movements in its plane, comprising a fixed mounting plate, a swinging arm pivoted to the plate and connected to the lower edge of the glass for shifting the same vertically, a projection fixed to the lower edge of the glass, and a cam carried by said plate and cooperating with said projection at a point intermediate the raised and lowered positions of the glass during the vertical travel of the glass for shifting the latter horizontally in its plane.

12. Regulator mechanism for a window glass mounted in a vehicle door window opening for successive vertical and horizontal movements in its plane, comprising a fixed mounting plate, means carried thereby for raising and lowering the glass, said glass at its lower edge and said plate having one thereof a projection and the other a cam cooperating with the projection at a point intermediate the top and bottom positions of the glass during the vertical travel of the glass for shifting the latter horizontally in its plane.

13. Regulator mechanism for a window glass mounted in a vehicle door window opening for vertical movement into and out of position to provide a ventilating slot at the forward edge of the glass and thence horizontally in the plane of the glass to close said slot, comprising means connected to the glass for raising and lowering the same, means cooperating with said first means for sliding the glass when in elevated position horizontally in its plane, and means cooperating with said second means for longitudinally displacing the position of the glass at a point intermediate its raised and lowered positions.

14. Regulator mechanism for a window glass mounted in a vehicle door window opening for vertical movement into and out of position to provide a ventilating slot at the forward edge of the glass and thence horizontally in the plane of the glass to close said slot, comprising means connected to the glass for raising and lowering the same, means cooperating with said first means for sliding the glass when in elevated position horizontally in its plane, and cam means cooperating with said second means for longitudinally displacing the position of the glass at a point intermediate its raised and lowered positions.

15. Regulator mechanism for a window glass mounted in a window frame of a vehicle body or the like, comprising a guide rail secured to the lower edge of the glass, a pair of swinging arms connected to said rail for raising and lowering the glass, and means controlled by said regulator mechanism for displacing the glass longitudinally during its vertical travel in one direction or the other.

16. Regulator mechanism for a window glass mounted in a window frame of a vehicle body or the like, comprising a guide rail secured to the lower edge of the glass, a pair of swinging arms connected to said rail for raising and lowering the glass, and means controlled by said regulator mechanism for displacing the glass longitudinally during its vertical travel in opposite directions.

ALBERT P. BALL.